United States Patent [19]

Van Tiggelen

[11] Patent Number: 4,744,036

[45] Date of Patent: May 10, 1988

[54] MICROPROCESSOR CONTROLLED HYDRAULIC SYSTEM FOR CLAMPING A DIE TO A PRESS

[75] Inventor: Douglas L. Van Tiggelen, Douglassville, Pa.

[73] Assignee: Dana Corporation, Toledo, Ohio

[21] Appl. No.: 920,571

[22] Filed: Oct. 17, 1986

[51] Int. Cl.⁴ .............................................. G06F 15/46

[52] U.S. Cl. ...................................... 364/476; 72/481; 100/99; 100/918; 364/472; 364/558

[58] Field of Search ............... 364/476, 184, 185, 558, 364/472; 100/43, 53, 99, 224, 229 R, 295, 918; 425/47; 72/446, 448, 481, 462, 8, 21; 83/461

[56] References Cited

U.S. PATENT DOCUMENTS

| | | | |
|---|---|---|---|
| 3,945,230 | 3/1976 | Tomioka et al. | 100/918 X |
| 4,383,808 | 5/1983 | Kubo et al. | 425/47 |
| 4,383,816 | 5/1983 | Kumazaki | 425/47 X |
| 4,433,620 | 2/1984 | Kiyosawa | 100/99 X |
| 4,534,725 | 8/1985 | Hemmelgarn et al. | 425/398 X |
| 4,612,796 | 9/1986 | Smyth, Jr. | 72/481 |

*Primary Examiner*—Joseph Ruggiero
*Attorney, Agent, or Firm*—MacMillan, Sobanski & Todd

[57] ABSTRACT

An improved control system for selectively clamping a die to a power press or similar machine by means of a plurality of hydraulically actuated clamps. Such hydraulically actuated clamps are provided for securing the opposed halves of the die to the bolster and ram of the press. The clamps are connected in alternating fashion to first and second fluid conduits for both the bolster and the ram. Each of the conduits is connected to a source of pressurized fluid. The first and second conduits on the bolster and the ram provide a safety redundancy feature in case one of the conduits on the bolster or the ram fails. Each of the conduits is provided with first and second pressure sensors. The first pressure sensors are each adapted to generate an electrical output signal when the pressure in the associated conduit falls below a first predetermined level. The second pressure sensors are each adapted to generate an electrical output signal when the pressure in the associated conduit falls below a second predetermined level, the second predetermined pressure level being less than the first predetermined pressure level. A microprocessor monitors the output signals from each of the pressure sensors and regulates the operation of the source of pressurized fluid, as well as the operation of the press itself, in response thereto. A snugging feature is included in the control system for causing the ram clamps to loosely engage one of the opposed die halves during the initial setup of the press. In this manner, the die halves can be positioned precisely relative to one another before beginning normal operation of the press.

8 Claims, 6 Drawing Sheets

MICROPROCESSOR CONTROLLED HYDRAULIC SYSTEM FOR CLAMPING A DIE TO A PRESS

BACKGROUND OF THE INVENTION

The present invention relates in general to control and safety systems for clamping mechanisms and in particular to an improved hydraulically actuated clamping system for selectively connecting a die to a press or similar machine.

A mechanical power press is a machine utilized to supply power to a die secured thereto in order to blank, form, or otherwise shape material into a desired configuration. Presses of this type are widely used throughout the world and typically include a bolster secured to a bed or base of the press and a ram secured to a slide of the press. The slide and the ram of the press are movable relatively to the bed and the bolster. A motor is provided for effecting such movement such that the ram is brought into engagement with or moved adjacent to the bolster with a predetermined amount of force. The die is typically formed of two opposed halves to form the material therebetween. The bolster and the ram include respective mounting surfaces for supporting the opposed halves of the die, which can be secured thereto by various means.

In the past, mechanically actuated clamps were utilized to releasably secure the die halves to the ram and the bolster. Such mechanical clamps typically included one or more threaded fasteners which extended through each of the die halves into engagement with the bolster and the ram. Such mechanical clamps have proven to be slow and inconvenient to use. More recently, hydraulically actuated clamps have been utilized in place of the mechanical clamps. Such clamps are connected to the bolster and the ram and are actuated by the application of pressurized fluid to clamp the opposed die halves thereto. The hydraulic clamps are connected to a source of pressurized fluid by one or more fluid conduits so as to selectively supply pressurized fluid thereto when it is desired to clamp the die halves to the bolster and the ram.

Although such hydraulic clamps are somewhat quicker and easier to operate than the prior mechanical clamps, safeguards must be included in such a hydraulically actuated clamping system to prevent the clamps from unexpectedly releasing the die halves in the event of an undesirable loss of fluid pressure, such as might be caused by failure of the source of pressurized fluid or by a leak in one of the conduits. Accordingly, it would be desirable to provide a control system for monitoring the status of such a hydraulic clamping system in order to ensure the safe operation thereof, as well as to enhance the efficiency of operation. It would also be desirable to provide a control system which permits the hydraulic clamps to loosely connect one of the die halves to the ram during the initial setup of the press, thereby allowing positioning adjustments of the die halves relative to one another before beginning normal operation of the press.

SUMMARY OF THE INVENTION

The present invention relates to an improved control system for selectively clamping a die to a power press or similar machine by means of a plurality of hydraulically actuated clamps. Such hydraulically actuated clamps are provided for securing the opposed halves of the die to the bolster and ram of the press. The clamps are connected in alternating fashion to first and second fluid conduits for both the bolster and the ram. Each of the conduits is connected to a source of pressurized fluid. The first and second conduits on the bolster and the ram provide a safety redundancy feature in case one of the conduits on the bolster or the ram fails. Each of the conduits is provided with first and second pressure sensors. The first pressure sensors are each adapted to generate an electrical output signal when the pressure in the associated conduit falls below a first predetermined level. The second pressure sensors are each adapted to generate an electrical output signal when the pressure in the associated conduit falls below a second predetermined level, the second predetermined pressure level being less than the first predetermined pressure level. A microprocessor monitors the output signals from each of the pressure sensors and regulates the operation of the source of pressurized fluid, as well as the operation of the press itself, in response thereto. A snugging feature is included in the control system for causing the ram clamps to loosely engage one of the opposed die halves during the initial setup of the press. In this manner, the die halves can be positioned precisely relative to one another before beginning normal operation of the press.

It is an object of the present invention to provide an improved hydraulically actuated clamping system for securing a die to a power press or similar machine.

It is another object of the present invention to provide such a clamping system which monitors the status of each fluid conduit within the system and controls the operation of the system, as well as the operation of the power press, in response thereto.

It is a further object of the present invention to provide such a clamping system which is able to loosely connect one of the die halves to the press to permit precise position adjustments during the initial setup thereof.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
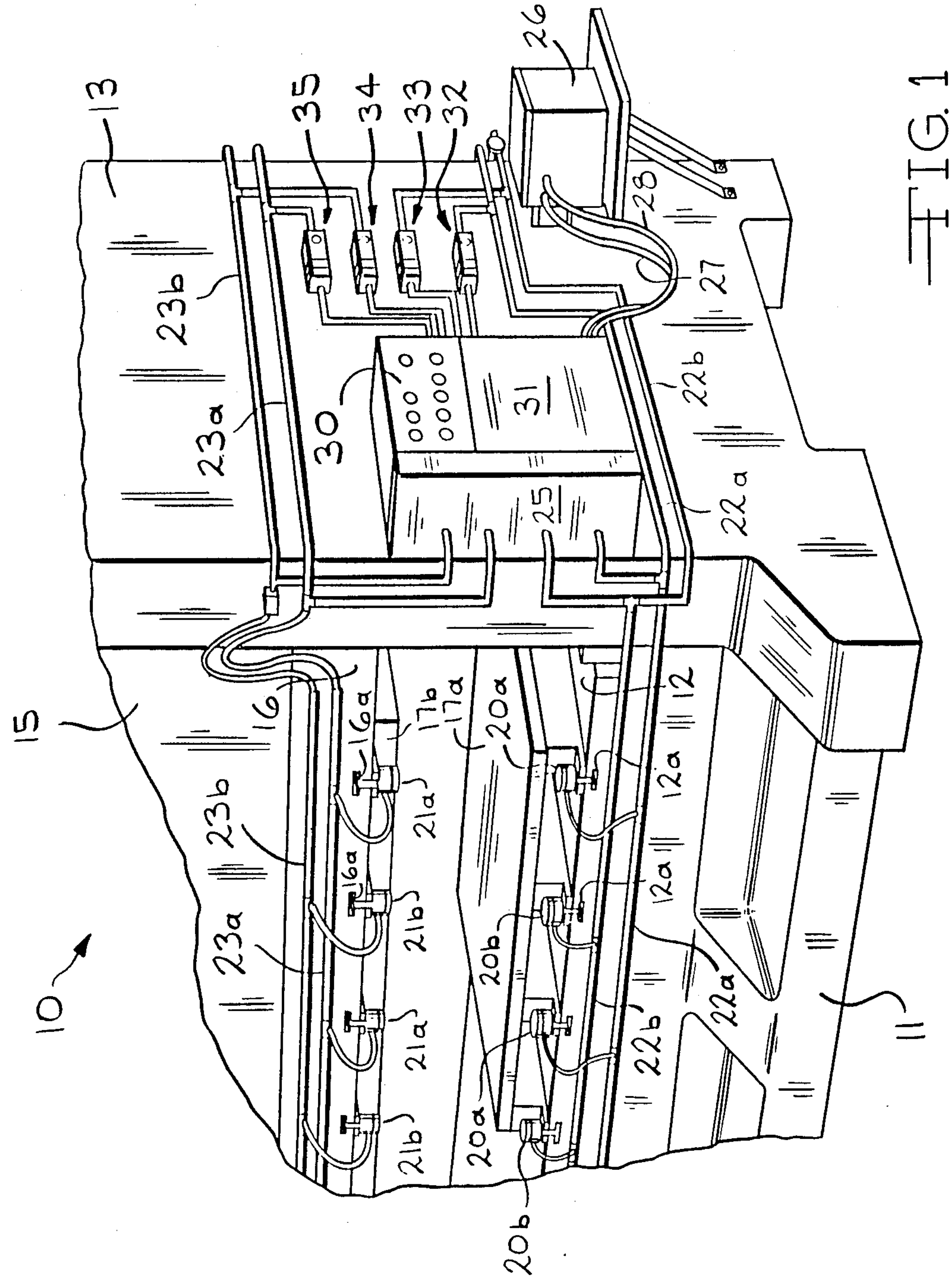
FIG. 1 is fragmentary perspective view of a portion of a power press machine including a hydraulically actuated clamping system in accordance with the present invention.

Referring now to FIG. 1, there is illustrated a portion of a power press machine, indicated generally at 10, including a hydraulically actuated clamping system in accordance with the present invention. The press 10 is conventional in the art and includes a bed or base 11 having a bolster 12 secured to the upper end thereof. A pair of uprights 13 (only one is illustrated) extend upwardly from the bed 11 on the opposite sides of the press 10. A crown (not illustrated) extends between the upper ends of the uprights 13. A slide 15 is carried by the crown and is movable vertically relative thereto. A motor (not shown) is also carried by the crown for selectively effecting such vertical movement of the slide 15. A ram 16 is secured to the lower end of the slide 15 and is movable therewith. The bolster 12 and the ram 16 have conventional pluralities of T-shaped slots **12*a* and 16*a*, respectively, formed therein for purposes described in detail below. Although the present invention will be described and illustrated in terms of a top driven power press machine 10**, it will be appreciated that the present invention can be utilized for clamping purposes in other environments.

A die, formed of a lower die half **17*a* and an upper die half 17*b*, is releasably secured to the press 10. The lower die half 17*a* is releasably secured to the bolster 12 by first and second pluralities of hydraulically actuated bolster clamps 20*a* and 20*b*, while the upper die half 17*b* is releasably secured to the ram 16 by first and second pluralities of hydraulically actuated ram clamps 21*a* and 21*b*. The bolster clamps 20*a* and 20*b* and the ram clamps 21*a* and 21*b* are conventional in the art and may all take the form of a hollow cylinder having a linearly movable T-bolt piston retained therein. As illustrated in FIG. 1, the hollow cylinders of the bolster clamps 20*a* and 20*b* and the ram clamps 21*a* and 21*b* cooperate with feet formed in the lower die half 17*a* and the upper die half 17*b*, respectively, while the T-bolt pistons of such clamps 20*a*, 20*b*, 21*a*, and 21*b* cooperate with the T-shaped slots 12*a* and 16*a* formed in the bolster 12 and the ram 16, respectively. When pressurized fluid is supplied to the bolster clamps 20*a* and 20*b* and the ram clamps 21*a* and 21*b*, the respective T-bolt pistons are withdrawn within the hollow cylinders in a known manner to clamp the lower die half 17*a* and the upper die half 17*b* respectively to the bolster 12 and the ram 16. When the pressurized fluid is discontinued, the T-bolt pistons are urged outwardly from the bolster clamps 20*a* and 20*b* and the ram clamps 21*a* and 21*b*, thereby releasing the lower die half 17*a* and the upper die half 17*b* respectively from the bolster 12 and the ram 16**.

Each of the first plurality of bolster clamps **20*a* is connected to a first bolster fluid conduit 22*a*, while each of the second plurality of bolster clamps 20*b* is connected to a second bolster conduit fluid 22*b*. Similarly, each of the first plurality of ram clamps 21*a* is connected to a first ram fluid conduit 23*a*, while each of the second plurality of ram clamps 21*b* is connected to a second ram fluid conduit 23*b*. The bolster conduits 22*a* and 22*b* and the ram conduits 23*a* and 23*b* are all connected to the outputs of a manifold 25. The inputs of the manifold 25 are connected to a source of pressurized fluid 26 by an input conduit 27 and an output conduit 28. The structure of the manifold 25 is illustrated in detail in FIG. 2, while the structure of the source of pressurized fluid 26 is illustrated in detail in FIG. 3**.

The operations of the manifold 25 and the source of pressurized fluid 26, as well as the operation of the press 10 itself, can be controlled by an operator by means of a control panel 30. The layout of the control panel 30 is illustrated in detail in FIG. 4. The control panel 30 provides an input means to a microprocessor or programmable controller 31 which, in turn, controls the operations of the manifold 25, the source of pressurized fluid 26, and the press 10. The microprocessor 31 is also responsive to electrical signals generated by various sensor means connected to the conduits **22*a*, 22*b*, 23*a*, and 23*b*. As shown in FIG. 1, the sensor means, indicated generally at 32, 33, 34, and 35, are respectively connected to the conduits 22*a*, 22*b*, 23*b*, and 23*a*. The relationship of the microprocessor 31 to the various electrical components contained in the manifold 25, the control panel 30, and the sensor means 32, 33, 34, and 35, is illustrated in detail in FIG. 5. Lastly, a simplified flow chart of one of the control programs utilized by the microprocessor 31 is illustrated in FIG. 6. It will be appreciated that the various elements of the press 10 and the control system of the present invention can be arranged differently from their arrangement in the illustrated embodiment. For example, the control panel 30 may be located remotely from the press 10. Also, the source of pressurized fluid 26 and the sensor means 32, 33, 34, and 35 may be disposed within a single cabinet secured to the press 10**. The illustrated embodiment is intended to simplify the understanding of the present invention.

Figure 2:
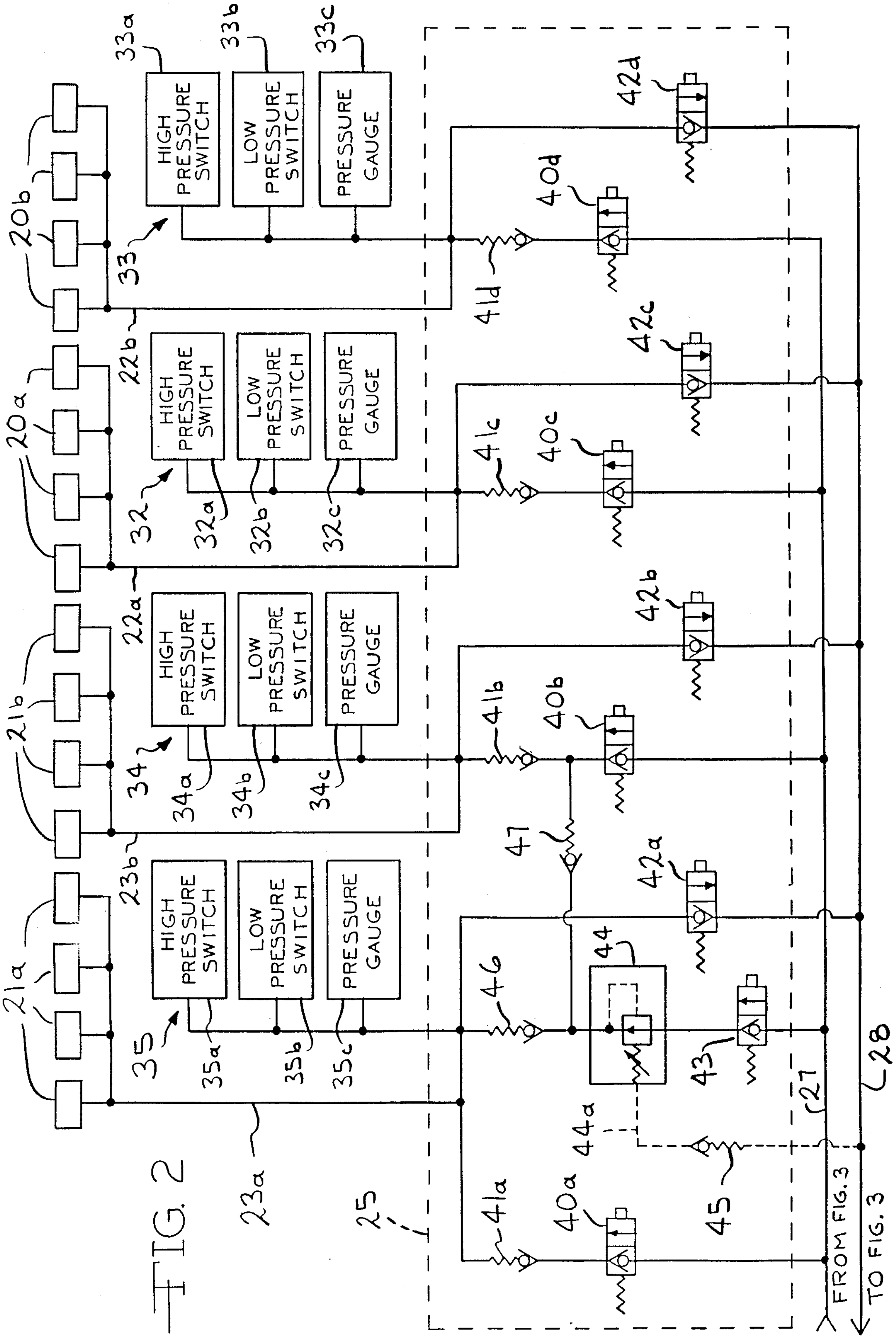
FIG. 2 is a block diagram of the control circuits contained in the manifold of the hydraulically actuated clamping system illustrated in FIG. 1.

Referring now to FIG. 2, there is illustrated a block diagram of the control circuits contained within the manifold 25 of the clamping system of the present invention. The input conduit 27 is connected through a two-way, solenoid-actuated control valve **40*a* and a check valve 41*a* to the first ram conduit 23*a*. The control valve 40*a* is biased to a normally closed position, whereby the flow of pressurized fluid from the input conduit 27 to the first ram conduit 23*a* is prevented. However, when the solenoid of the control valve 40*a* is activated in the manner described below, the control valve 40*a* is moved to an opened position to permit the flow of pressurized fluid from the input conduit 27 to the first ram conduit 23*a*. The check valve 41*a* prevents the flow of fluid from the first ram conduit 23*a* to the input conduit 27 under any circumstances. Similar control valves 40*b*, 40*c*, and 40*d* and check valves 41*b*, 41*c*, and 41*d* are respectively connected between the input conduit 27 and the second ram conduit 23*b*, the first bolster conduit 22*a*, and the second bolster conduit 22*b*. The control valves 40*a*, 40*b*, 40*c*, and 40*d* will be referred to as charge valves, inasmuch as they are utilized to increase the level of the fluid pressure in the conduits 23*a*, 23*b*, 22*a*, and 22*b***, respectively.

A two-way, solenoid-actuated valve **42*a* is connected between the first ram conduit 23*a* and the output conduit 28. The control valve 42*a* is biased toward a normally closed position, whereby the flow of fluid from the first ram conduit 23*a* to the output conduit 28 is prevented. When the solenoid of the control valve 42*a* is actuated in the manner described below, however, the control valve 42 is moved to an opened position, whereby the flow of pressurized fluid from the first ram conduit 23*a* to the output conduit 28 is permitted. Similar control valves 42*b*, 42*c*, and 42*d* are respectively connected between the output conduit 28 and the second ram conduit 23b, the first bolster conduit 22a, and the second bolster conduit 22b. The control valves 42a, 42b, 42c, and 42d will be referred to as vent valves, inasmuch as they are utilized to reduce the level of the fluid pressure in the conduits 23a, 23b, 22a, and 22b**, respectively.

A two-way, solenoid-actuated control valve 43 is connected between the input conduit 27 and a reducing valve 44. The control valve 43 is biased to a normally closed position, wherein the flow of pressurized fluid from the input conduit 27 to the reducing valve 44 is prevented. When the solenoid of the control valve 43 is activated in the manner described below, the control valve 43 is moved to an opened position, whereby the flow of pressurized fluid from the input conduit 27 to the reducing valve 44 is permitted. The reducing valve 44 includes an adjustable return conduit 44a which is connected through a check valve 45 to the output conduit 28. The check valve 45 permits the one-way flow of pressurized fluid from the reducing valve 44 to the output conduit 28. The reducing valve 44 is adapted to provide an adjustable amount of fluid pressure therethrough. The output of the reducing valve 44 is connected through a check valve 46 to the first ram conduit 23a. The check valve 46 permits the one-way flow of pressurized fluid from the output of the reducing valve 44 to the first ram conduit 23a. The output of the reducing valve 44 is also connected through a check valve 47 to the junction between the charge valve 40b and the check valve 41b. The check valve 47 permits the one-way flow of fluid from the reducing valve 44 to that junction. As mentioned above, the check valve 41b permits the one-way flow of fluid therethrough to the second ram conduit 23b.

The control valve 43 will be referred to as a snugging valve because it permits the ram clamps 21a and 21b to be actuated by the fluid pressure in the input conduit 27, but at a reduced pressure level therefrom because of the reducing valve 44. As a result, the ram clamps 21a and 21b are actuated to loosely secure the upper die half 17b to the ram 16. The reducing valve 44 is adjusted such that the reduced actuating pressure level is sufficient to enable the ram clamps 21a and 21b to reliably hold the upper die half 17b to the ram 16, but permit the upper die half 17b to move slightly relative to the ram 16.

The snugging valve 43 is utilized to adjust the position of the upper die half 17b relative to the lower die half 17a after it has been secured to the ram 16. To accomplish this, the die halves 17a and 17b are initially disposed adjacent the bolster 12 and the ram 16. The solenoid of the snugging valve 43 is then actuated to loosely connect the upper die half 17b to the ram 16. The bolster clamps 20a and 20b are actuated to their normal operating condition by the charge valves 40c and 40d. The ram 16 of the press 10 is then inched through one complete cycle by the operator. As the upper die half 17b moves into cooperation with the lower die half 17a, the upper die half 17b may be moved slightly relative to the lower die half 17a because of inaccuracies in the original positioning of the die halves 17a and 17b. Since the ram clamps 21a and 21b are actuated at the relatively low pressure level, the upper die half 17b is permitted to be moved slightly if necessary. Once this has been done, the snugging valve 43 is closed and the charge valves 40a and 40b are opened to clamp the upper die half 17b at the full pressure level contained in the input conduit 27.

As mentioned above, the sensor means 35 is connected to the first ram conduit 23a. As shown in FIG. 2, the sensor means 35 can include a high pressure switch 35a, a low pressure switch 35b, and a pressure gauge 35c. The pressure switches 35a and 35b are conventional devices which are responsive to the level of the fluid pressure in the first ram conduit 23a. The high pressure switch 35a generates an electrical output signal when the pressure in the first ram conduit 23a falls below a first predetermined level, while the low pressure switch 35b generates an electrical output signal when the pressure in the first ram conduit 23a falls below a second predetermined level. The second predetermined level is selected to be lower than the first predetermined level. The pressure gauge 35c is also a conventional device which provides a visual display of the pressure level in the first ram conduit 23a. The sensor means 34, 32, and 33 are respectively connected to the second ram conduit 23b, the first bolster conduit 22a, and the second bolster conduit 22b, and are similar in structure and operation to the above-described sensor means 35. The pressure gauges 32c, 33c, 34c, and 35c may be located remotely from the pressure switches, such as on the control panel 30.

Figure 3:
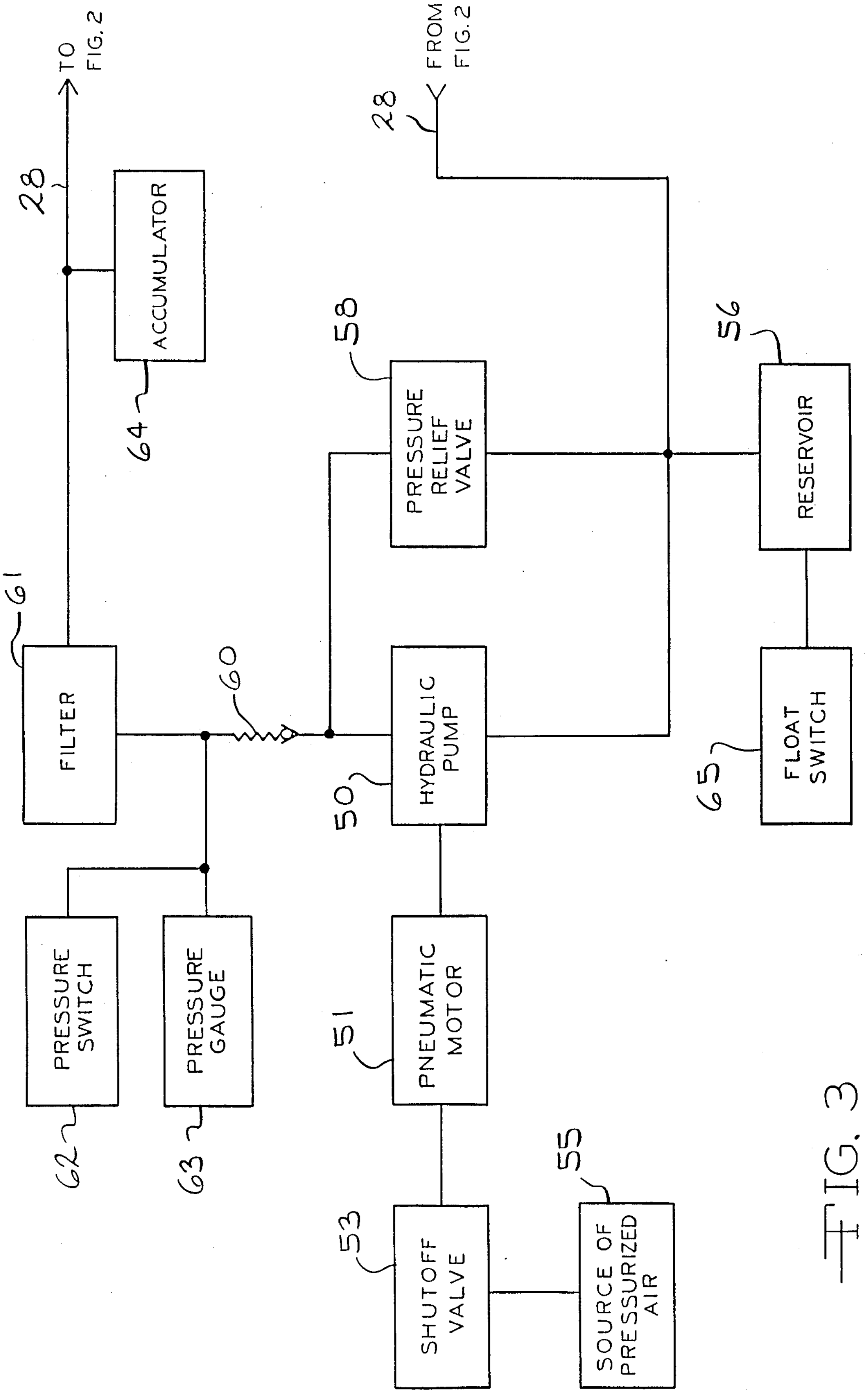
FIG. 3 is a block diagram of the source of pressurized fluid of the hydraulically actuated clamping system illustrated in FIG. 1.

Referring now to FIG. 3, a block diagram of the source of pressurized fluid of the hydraulically actuated clamping system of the present invention is illustrated. A hydraulic pump 50 is driven by a pneumatic motor 51. The pneumatic motor 51 is connected through a shutoff valve 53 to a source of pressurized air 55. When the shutoff valve 53 is opened, the source of pressurized air 55 drives the pneumatic motor 51 which, in turn, operates the hydraulic pump 50. When so operated, the hydraulic pump 50 draws fluid from a reservoir 56. A pressure relief valve 58 is connected between the output of the hydraulic pump 50 and the reservoir 56 as a safety device. The output of the hydraulic pump 50 is connected through a check valve 60 and through a filter 61 to the input conduit 27. The filter 61 is conventional in the art and includes means for generating an electrical output signal when the filter becomes clogged with contaminants. A pressure switch 62 and a pressure gauge 63 are also connected to the input conduit 27. The pressure switch 62 is responsive to the pressure level of the fluid in the input conduit 27 and generates an electrical output signal when such pressure level reaches a predetermined nominal operating value. The pressure gauge 63 is also responsive to the pressure level in the input conduit 27 and generates a visual indication thereof.

A conventional accumulator 64 is also connected to the input conduit 27. The accumulator 64 stores pressurized fluid therein at a predetermined nominal operating level. Typically, such nominal operating pressure level is approximately three thousand p.s.i. When the hydraulic pump 50 achieves the pressure level, the pressure switch 62 de-activates the pneumatic motor 51 to prevent the pressure level from rising further. The check valve 60 prevents the pressurized fluid in the input conduit 27 from flowing backwards into the reservoir 56. The float switch 65 is conventional in the art and is responsive to the level of the fluid contained in the reservoir 56 for generating an electrical output signal when such fluid level drops below a predetermined level.

Figure 4:
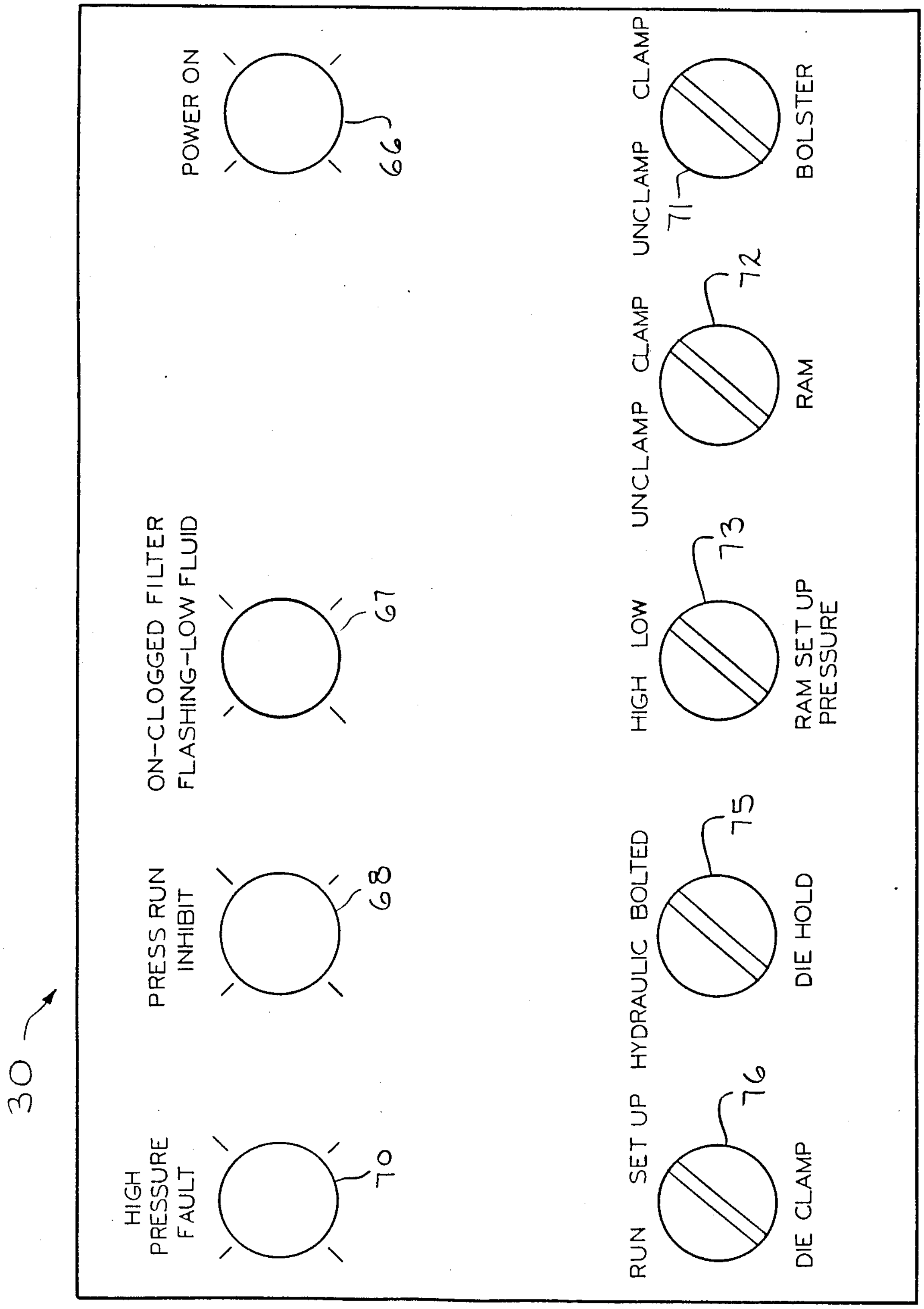
FIG. 4 is an elevational view of the control panel of the hydraulically actuated clamping system illustrated in FIG. 1.

Referring now to FIG. 4, the control panel 30 of the clamping system of the present invention is illustrated in detail. As shown therein, the control panel 30 includes visual indicating means for informing the operator of the status of the clamping system of the present invention, as well as of the status of operation of the press 10. In the illustrated embodiment, a first light 66 is illuminated when the power to the clamping system of the present invention has been turned on. A second light 67 is illuminated in continuous fashion when the filter 61 becomes clogged with contaminants, as described above. The second light 67 is illuminated in flashing fashion when the float switch 65 senses that the level of the fluid in the reservoir 56 is too low, also as described above. A third light 68 is illuminated when the operation of the press 10 has been inhibited by the control system, such as will be described in detail below. Lastly, a fourth light 70 is illuminated when one of the sensor means 32, 33, 34, or 35 determines that the pressure level in one of the conduits **22*a*, 22*b*, 23*a*, or 23*b*** is too low. Although the visual indicating means of the present invention is described and illustrated in terms of illuminating lights, it will be appreciated that other equivalent indicating means may be utilized.

The control panel 30 also includes a plurality of switch means for allowing an operator to control the operation of the clamping system and the press 10. A first switch 71 is provided to selectively activate and de-activate the bolster clamps **20*a* and 20*b* so as to secure or release the lower die half 17*a* to the bolster 12. Similarly, a second switch 72 is provided to selectively activate and de-activate the ram clamps 21*a* and 21*b* so as to secure or release the upper die half 17*b* to the ram 16. A third switch 73 is provided to adjust the pressure level in the ram conduits 23*a* and 23*b* between low and high levels The third switch 73 operates the snugging valve 43 so as to provide a relatively low pressure level in the ram conduits 23*a* and 23*b* during the initial setup of the press 10, and further operates the charge valves 40*a* and 40*b* to provide a relatively high pressure level (the nominal operating pressure level) in the ram conduits 23*a* and 23*b* during normal operation thereof. A fourth switch 75 may be provided to activate the clamping system of the present invention when it is desired to clamp the die halves 17*a* and 17*b* hydraulically to the bolster 12 and the ram 16, but to de-activate the clamping system of the present invention when it is desired to bolt the die halves 17*a* and 17*b* to the bolster 12 and the ram 16, as is known in the prior art. Lastly, a fifth switch 76 may be provided to activate the clamping system of the present invention when the setup of the press 10 has been completed and it is desired to operate the press under normal conditions. Some or all of the switch means illustrated in the control panel 30** may be actuable only by means of a key for safety reasons.

Figure 5:
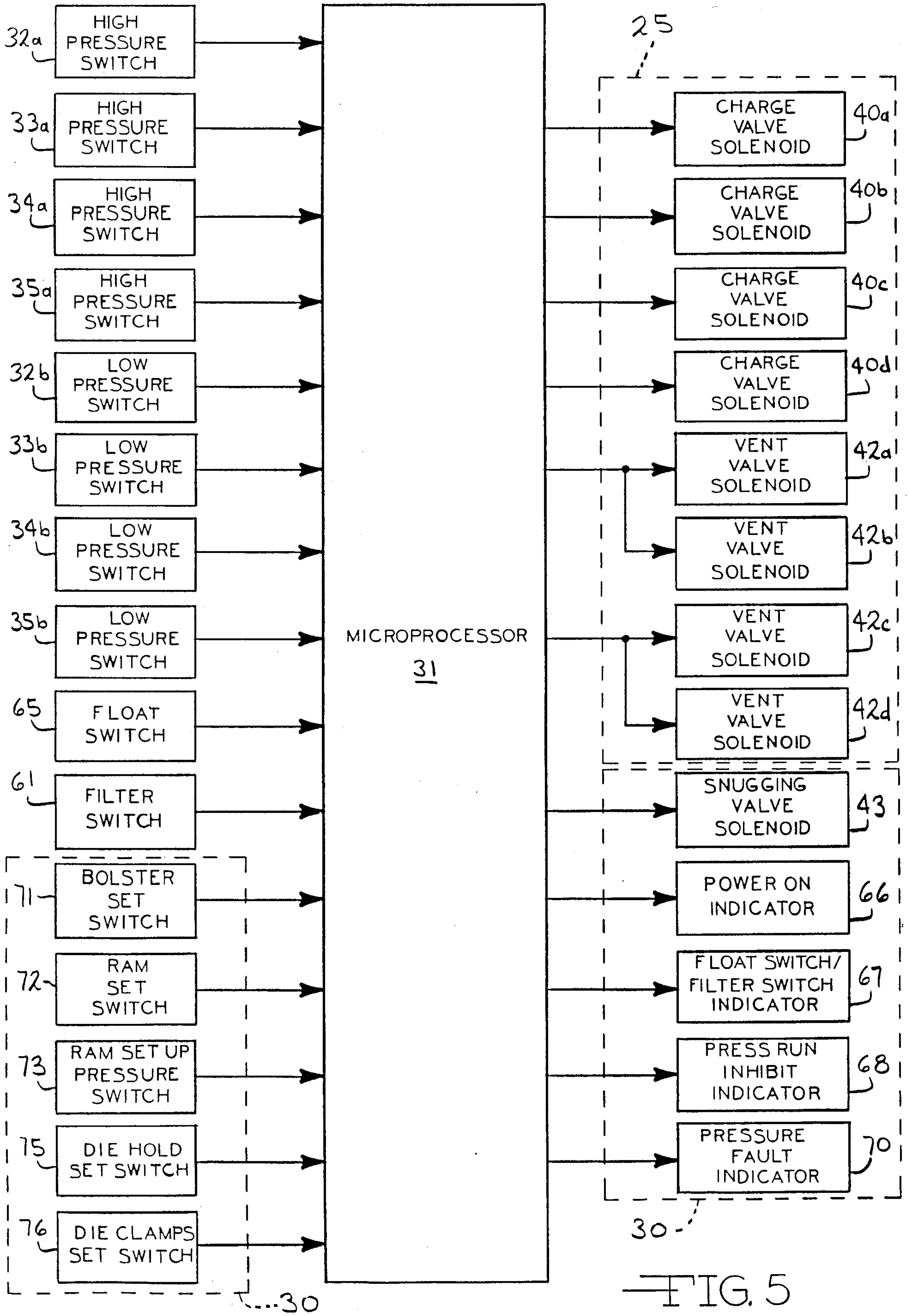
FIG. 5 is a block diagram of the electrical control circuit of the hydraulically actuated clamping system illustrated in FIG. 1.
Figure 6:
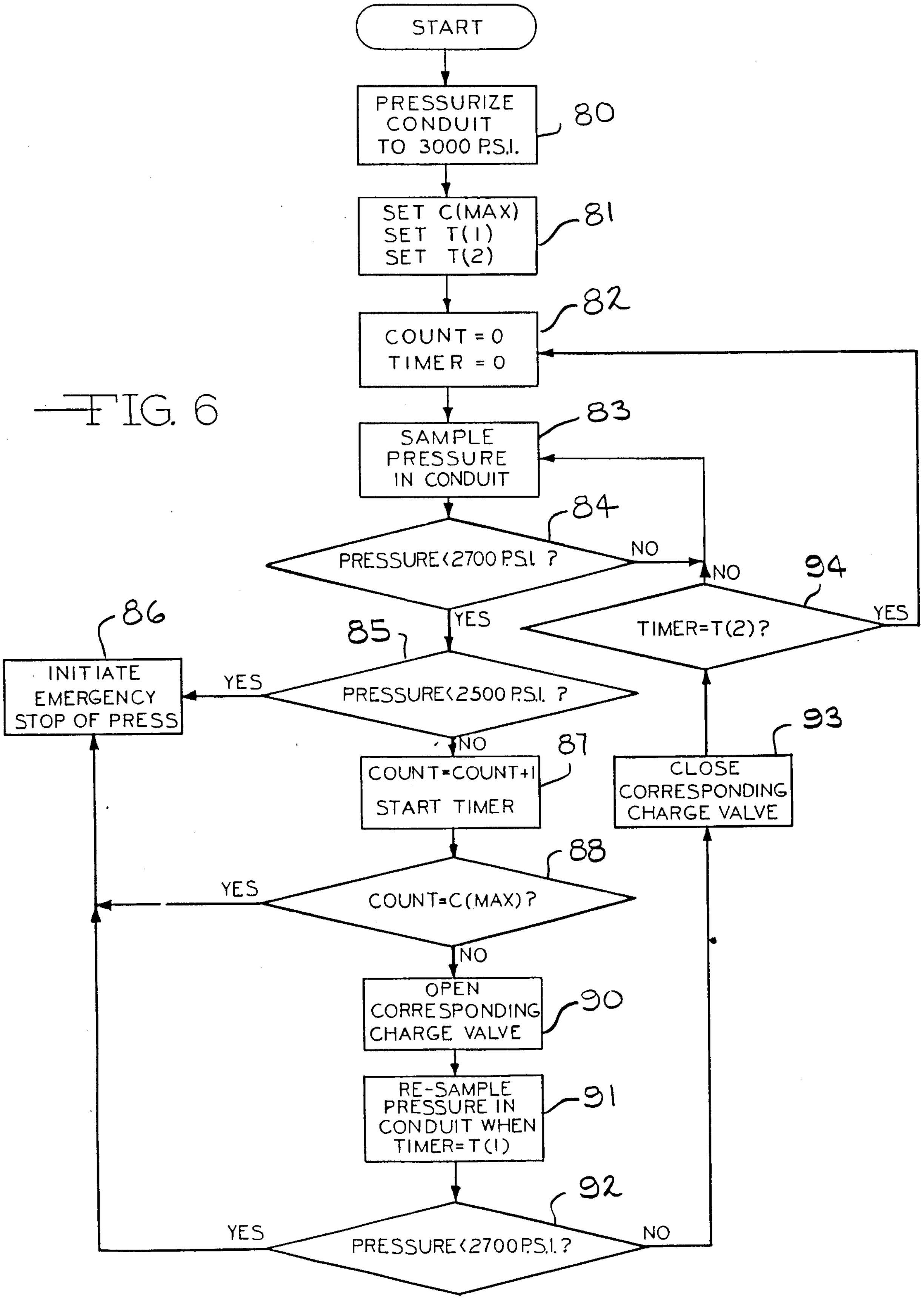
FIG. 6 is a simplified flow chart of one control program utilized by the microprocessor illustrated in FIG. 5.

FIG. 5 illustrates the various inputs and outputs of the microprocessor 31. Each of the high and low pressure switches of each of the sensor means 32, 33, 34, and 35 is connected as an input to the microprocessor 31, which is responsive to the electrical output signals generated thereby. Similarly, the float switch 65, the filter switch 61, and each of the switch means 71 through 76 contained in the control panel 30 are also connected as inputs to the microprocessor 31. The outputs of the microprocessor 31 are connected to various components within the manifold 25 and the control panel 30. Within the manifold 25, the microprocessor 31 controls the operation of each of the solenoids of the charge valves **40*a*, 40*b*, 40*c*, and 40*d*, each of the solenoids of the vent valves 42*a*, 42*b*, 42*c*, and 42*d*, and the solenoid of the snugging valve 43. Within the control panel 30, the microprocessor 31 controls the operation of each of the visual indicators 66, 67, 68, and 70**.

Referring now to FIG. 6, there is illustrated a simplified flow chart illustrating the steps which are taken by the microprocessor 31 to determine if the clamping system of the present invention is operating properly and to determine what steps are necessary if a fault in the clamping system is detected. The microprocessor 31 may be programmed in any conventional manner to achieve the steps indicated in the flow chart. The illustrated program relates only to the steps which are followed for monitoring the pressure level of the first ram conduit **23*a* and controlling the operation of the clamping system and the press 10 in response thereto. The same or similar program can be utilized with each of the other conduits 23*b*, 22*a*, and 22*b*. The microprocessor 31 can be programmed to execute the illustrated program simultaneously with respect to each of the conduits 23*a*, 23*b*, 22*a*, and 22*b*,** or alternatively may execute such programs sequentially.

The program initially enters an instruction block 80 which directs the microprocessor 31 to raise the pressure level in the ram conduit **23*a* to the nominal operating pressure level of three thousand p.s.i. In order to do this, the microprocessor 31 activates the charge valve solenoid 40*a* to permit pressurized fluid to flow from the input conduit 27 to the first ram conduit 23*a*. The program next enters an instruction block 81 which initializes program parameters C(MAX), T(1), and T(2). The C(MAX) parameter is utilized to determine the maximum number of faults which may be detected by the control system before an emergency stop of the press 10 is initiated. The T(1) parameter is utilized to determine a first predetermined period of time, while the T(2) parameter is utilized to determine a second predetermined period of time. The T(2) period of time is longer than the T(1) period of time. The program next enters an instruction block 82 which initializes program parameters COUNT and TIMER to zero. The COUNT parameter is utilized to accumulate the number of faults which are detected in the conduit 23*a*.** The TIMER parameter is utilized to generate an indication of real time passage since the first detection of a fault by the control system.

Following such initialization, the program next enters an instruction block 83 which causes the microprocessor 31 to sample the pressure level in the first ram conduit **23*a*. Such sampling is accomplished by the microprocessor 31 by interrogating the inputs thereto from the high pressure switch 35*a* and the low pressure switch 35*b*. The program next enters a decision block 84, wherein it is determined whether the pressure level in the first ram conduit 23*a* is less than two thousand seven hundred p.s.i. If the pressure level in the first ram conduit 23*a* is greater than this first predetermined level, then neither of the pressure switches 35*a* and 35*b* will generate an electrical output signal to the microprocessor 31. Assuming this to be the case, the program branches to the instruction block 83, wherein the pressure level sampling process begins again. This sampling process is repeated so long as the pressure level in the first ram conduit 23*a*** remains above the first predetermined level. This is the normal operating condition of the clamping system of the present invention.

Returning to the decision block 84, the program will branch to a second decision block 85 if the high pressure switch **35*a* is generating an electrical output signal because the pressure level in the first ram conduit 23a has fallen below the first predetermined level. The second decision block 85 instructs the microprocessor 31 to determine if the pressure level in the first ram conduit 23***a* is also less than a second predetermined level of two thousand five hundred p.s.i. If the pressure level in the first ram conduit 23*a* is less than this second predetermined level, the low pressure switch 35*b* generates an electrical output signal to the microprocessor 31. In response thereto, the program branches to an instruction block 86, which causes the microprocessor 31 to execute an emergency stop of the press 10. Thus, when the pressure in the conduit 23*a* falls below the second predetermined level, a leak or other fault of sufficient magnitude has occurred which, for safety reasons, cannot be corrected by the clamping system of the present invention without an operator reviewing the situation personally. Thus, the operation of the press 10 is inhibited until the fault is located and corrected. When this occurs, the microprocessor 31 also causes the third light 68 to be illuminated so as to alert an operator of the tion of the press 10.

If, however, the pressure level in the first ram conduit 23*a* is between the first and second predetermined pressure levels, the program branches to an instruction block 87. In response thereto, the microprocessor 31 increments the value of the COUNT parameter by one, thereby keeping track of the number of faults which have occurred. The microprocessor 31 also activates the TIMER parameter in order to generate an indication of the amount of time which has passed since the fault was first detected.

The program next enters a decision block 88, wherein the microprocessor 31 determines whether the COUNT parameter is equal to C(MAX) parameter. The C(MAX) parameter may be set at five, for example, or any other desired number. If five faults have been counted in the first ram conduit 23*a*, it would indicate that a serious leak or other fault is re-occurring in the conduit 23*a* which cannot be corrected by the clamping system, despite repeated attempts to do so. In response thereto, the program branches to the instruction block 86, wherein an emergency stop of the press 10 is initiated so that an operator may investigate and correct the situation. If the predetermined maximum number of faults has not been reached, the program enters an instruction block 90. The instruction block 90 causes the microprocessor 31 to activate the solenoid of the charge valve 40*a* to connect the input conduit 27 to the first ram conduit 23*a*. In this manner, the pressure level of the first ram conduit 23*a* is automatically raised back up to the nominal level of three thousand p.s.i. by the clamping system of the present invention.

The program next enters an instruction block 91, which causes the microprocessor 31 to re-sample the pressure level of the first ram conduit 23*a* after a first predetermined period of time, namely, the value of the T(1) parameter. The program then enters a decision block 92, wherein the microprocessor 31 determines whether the re-sampled pressure level in the first ram conduit 23*a* is still less than the first predetermined pressure level. If it is, the program branches to the emergency stop instruction block 86. This condition would indicate that the clamping system of the present invention has been unable to automatically correct the leak or other fault detected in the first ram conduit 23*a* within an acceptable period of time, defined by T(1). Thus, an emergency stop of the press 10 is initiated to permit an operator to examine and correct the situation. For example, the maximum acceptable time for the clamping system of the present invention to automatically raise the pressure level in the first ram conduit 23*a* above the first predetermined level can be set at two seconds. Thus, if the pressure level in the first ram conduit 23*a* remains below two thousand seven hundred p.s.i. for longer than two seconds, an emergency stop of the press 10 will be initiated.

On the other hand, if the pressure level in the first ram conduit 23*a* is raised above the first predetermined level within the first predetermined period of time, the program will branch to an instruction block 93. The instruction block 93 causes the microprocessor 31 to de-activate the solenoid of the charge valve 40*a* which was previously activated, thereby disconnecting the first ram conduit 23*a* from the input conduit 27 for normal operation. The program next enters a decision block 94, wherein the microprocessor 31 determines whether the TIMER has reached the second predetermined time period defined by T(2). In other words, the microprocessor 31 determines if the second predetermined period of time determined by the T(2) parameter has elapsed since the fault was first detected. If it has, the program branches to the instruction block 82, which resets the value of the COUNT and TIMER parameters to zero. If it has not, the program branches back to the instruction block 83, thus preventing the COUNT and TIMER parameters from being reset to zero. The program continues in the same fashion as described above. Thus, it will continue to accumulate upwardly as faults are detected until the second predetermined time period defined by the T(2) parameter has elapsed since the first fault was detected. Accordingly, an emergency stop of the press 10 will be initiated if the control system is required to re-pressurize the first ram conduit 23*a* an excessive number of times within the second predetermined period of time.

In accordance with the provisions of the patent statutes, the principle and mode of operation of the present invention has been explained and illustrated in its preferred embodiment. However, it will be appreciated that the present invention can be practiced other than as specifically explained and illustrated without departing from the spirit or scope.

What is claimed is:

1. In a press having a bolster, a ram movable relatively to the bolster, and hydraulic clamping means for selectively securing upper and lower die halves respectively to the ram and the bolster, the hydraulic clamping means including a plurality of hydraulically actuated clamps connected through conduit means to a source of pressurized fluid, a system for controlling the operation of the hydraulic clamping means comprising:

first pressure sensor means responsive to the pressure level in the conduit means for generating an output signal when said pressure level is less than a first predetermined level;

second pressure sensor means responsive to the pressure level in the conduit means for generating an output signal when said pressure level is less than a second predetermined level, said second predetermined level being less than said first predetermined level; and means responsive to said output signals of said first and second pressure sensor means for attempting to increase the pressure level in the conduit means when said pressure level is less than said first predetermined level and greater than said second predetermined level.

2. A system as claimed in claim 1 wherein the system also controls the operation of the press and includes means responsive to said output signals of said first and second pressure sensor means for stopping the operation of the press when said pressure level is less than said second predetermined level.

3. A system as claimed in claim 1 wherein the system also controls the operation of the press and includes means responsive to said output signals of said first and second pressure sensor means for stopping the operation of the press when said pressure level is less than said first predetermined level and greater than said second predetermined level for longer than a predetermined period of time.

4. A system as claimed in claim 1 wherein the system also controls the operation of the press and includes means responsive to said output signals of said first and second pressure sensor means for stopping the operation of the press when said pressure level remains above said second predetermined level but falls below said first predetermined level by more than a predetermined number of times within a predetermined period of time.

5. A system as claimed in claim 1 wherein the system also controls the operation of the press and includes means responsive to said output signals of said first and second pressure sensor means for stopping the operation of the press when said pressure level is less than said second predetermined level and for stopping the operation of the press when said pressure level is less than said first predetermined level and greater than said second predetermined level for longer than a predetermined period of time.

6. A system as claimed in claim 1 wherein the system also controls the operation of the press and includes means responsive to said output signals of said first and second pressure sensor means for stopping the operation of the press when said pressure level is less than said second predetermined level and for stopping the operation of the press when said pressure level remains above said second predetermined level but falls below said first predetermined level by more than a predetermined number of times within a predetermined period of time.

7. A system as claimed in claim 1 wherein the system also controls the operation of the press and includes means responsive to said output signals of said first and second pressure sensor means for stopping the operation of the press when said pressure level is less than said first predetermined level and greater than said second predetermined level for longer than a predetermined period of time and for stopping the operation of the press when said pressure level remains above said second predetermined level but falls below said first predetermined level by more than a predetermined number of times within a predetermined period of time.

8. A system as claimed in claim 1 wherein the system also controls the operation of the press and includes means responsive to said output signals of said first and second pressure sensor means for stopping the operation of the press when said pressure level is less than said second predetermined level, and for stopping the operation of the press when said pressure level is less than said first predetermined level and greater than said second predetermined level for longer than a predetermined period of time, and for stopping the operation of the press when said pressure level remains above said second predetermined level but falls below said first predetermined level by more than a predetermined number of times within a predetermined period of time.

* * * * *